United States Patent [19]
Hyuga

[11] Patent Number: 5,696,781
[45] Date of Patent: Dec. 9, 1997

[54] WAVELENGTH-CONVERSION LASER HAVING NONLINEAR OPTICAL CRYSTAL WHICH EFFECTS TYPE-I PHASE-MATCHING

[75] Inventor: Hiroaki Hyuga, Kanagawa-ken, Japan

[73] Assignee: Fuji Photo Film Co., Ltd., Kanagawa, Japan

[21] Appl. No.: 487,520

[22] Filed: Jun. 7, 1995

[30] Foreign Application Priority Data

Oct. 14, 1994 [JP] Japan .................................. 6-249814

[51] Int. Cl.$^6$ ........................................................ H01S 3/10
[52] U.S. Cl. ........................................................ 372/21; 372/22
[58] Field of Search ........................ 372/21, 22; 359/326, 359/328, 330

[56] References Cited

U.S. PATENT DOCUMENTS

| | | | |
|---|---|---|---|
| 4,951,294 | 8/1990 | Basu et al. | 372/21 |
| 5,415,743 | 5/1995 | Harada | 372/22 |
| 5,446,749 | 8/1995 | Nighan et al. | 372/22 |

OTHER PUBLICATIONS

Abstracts of Spring Meeting 1993; The Japan Society of Applied Physics and Related Societies, pp. 31 Z-4 No Date.

*Primary Examiner*—Rodney B. Bovernick
*Assistant Examiner*—Robert E. Wise
*Attorney, Agent, or Firm*—Sughrue,Mion,Zinn,Macpeak & Seas, PLLC

[57] ABSTRACT

A wavelength-conversion laser capable of maintaining a single longitudinal mode even when the temperature of a resonator changes. The wavelength-conversion laser is made up of a solid-state laser crystal doped with Neodymium which is pumped by light, a nonlinear optical crystal disposed in a resonator for converting the wavelength of a solid-state laser bee emanated from the solid-state laser crystal, and an etalon disposed in the resonator for realizing a single longitudinal mode. The nonlinear optical crystal is a crystal, which effects type-I phase-matching, such as MgO:LiNbO$_3$ crystal. Moreover, the nonlinear optical crystal possesses periodic domain reversals.

10 Claims, 1 Drawing Sheet

WAVELENGTH-CONVERSION LASER HAVING NONLINEAR OPTICAL CRYSTAL WHICH EFFECTS TYPE-I PHASE-MATCHING

BACKGROUND OF THE INVENTION

1. Field of the Invention

The invention relates to a solid-state laser using a Nd:YVO$_4$ crystal as a laser medium, and more particularly to a solid-state laser possessing a wavelength-conversion function and being adapted to realize a single longitudinal mode.

2. Description of the Prior Art

There is a solid-state laser, wherein a solid-state laser crystal doped with Neodymium (Nd) is pumped with a laser beam emanated from a semiconductor laser or the like. In this type of a solid-state laser, in order to obtain a laser beam having a shorter wavelength, it is widely practiced to convert the wavelength of a solid-state laser beam to a second harmonic wave by arranging a nonlinear optical material in a resonator in the solid-state laser.

Similarly to other types of laser system, as regards the previously mentioned wavelength-conversion laser, there is a demand for oscillation in a longitudinal mode in order to suppress output variations resulting from longitudinal mode competition. To meet this demand, an attempt has already been made to adapt a Nd:YVO$_4$ (a YVO$_4$ crystal doped with Nd), which facilitates realization of oscillation in a single longitudinal mode, to a solid-state laser medium.

However, even when such a Nd:YVO$_4$ crystal is adapted to the solid-state laser, it is evident that the solid-state laser becomes prone to cause oscillation in a multiple longitudinal mode. As disclosed in, for example, abstracts of Spring Meeting 1993; the Japan Society of Applied Physics and Related Societies, pp. 31 Z-4, a wavelength-conversion laser has been put forward which is designed to ensure the realization of a single longitudinal mode to a greater extent by means of an etalon disposed in a resonator together with a KTP crystal which is a nonlinear optical crystal.

However, even when the etalon is utilized in this way, if the temperature of the resonator in the laser changes, oscillation in a multiple longitudinal mode may develop.

SUMMARY OF THE INVENTION

The present invention is made in view of the foregoing drawback in the art, and the object of this invention is to provide a wavelength-conversion laser capable of realizing a single longitudinal mode by stabilizing an oscillation mode.

According to one aspect of the present invention, this object is achieved by a wavelength-conversion laser including a YVO$_4$ crystal doped with Neodymium (Nd) which is pumped by light, a nonlinear optical crystal disposed in a resonator for converting the wavelength of a solid-state laser beam emitted from the YVO$_4$ crystal, and an etalon disposed in the resonator for changing the mode of oscillation of the solid-state laser beam to a single longitudinal mode, the wavelength-conversion laser comprising a crystal for realizing type-I phase matching being employed as the nonlinear optical crystal.

In one preferred embodiment of the present invention, the nonlinear optical crystal has periodic domain reversals.

In another preferred embodiment of the present invention, the nonlinear optical crystal possessing the periodic domain reversals is a MgO:LiNbO$_3$ crystal.

As a result of research that inventors of the present invention carried out, it turned out that a conventional laser using the previous KTP and the etalon is prone to cause a multiple longitudinal mode. This is ascribed to the following reasons. Specifically, the KTP crystal is a nonlinear optical crystal which effects type-II phase-matching, and the KTP crystal and the Nd:YVO$_4$ crystal are arranged in such a way that azimuth angles of the crystals are inclined at an angle of 45° in relation to each other. In this arrangement, if the temperature of a resonator including the temperature of the KTP crystal varies, an intrinsic polarization mode of the resonator will also vary, and σ polarization oscillation will also occur in addition to π polarization oscillation. This will put the laser into a multiple longitudinal mode.

Contrary to this, when the laser uses a crystal, which realizes type-I phase matching, as the nonlinear optical crystal in the same manner as in the present invention, the nonlinear optical crystal and the Nd:YVO$_4$ crystal are arranged in such a way that azimuths of these crystals are substantially matched with each other. In such a configuration, a solid-state laser beam, serving as a fundamental wave, causes π polarization oscillation by virtue of anisotropy of the Nd:YVO$_4$ crystal (a difference between π polarization and σ polarization). Even if the temperature of the resonator changes, an intrinsic polarization mode of the laser will remain unchanged. Therefore, π polarization oscillation will be constantly maintained, and a laser beam will also be maintained in a single longitudinal mode.

In the wavelength-conversion laser of the present invention, effects resulting from the realization of a stable single longitudinal mode are obtained in the manner as previously mentioned. An allowable error in adjustment of the temperature of the resonator is increased, and a relatively simple and inexpensive temperature control means will become available. In addition, the increase of the allowable error in the adjustment of the temperature of the resonator will also result in the wavelength-conversion laser being remarkably improved in age-based stability compared with a conventional wavelength-conversion laser. It becomes possible to effect oscillation in a single longitudinal mode over a long period of time.

DESCRIPTION OF THE PREFERRED EMBODIMENT

Figure 1:
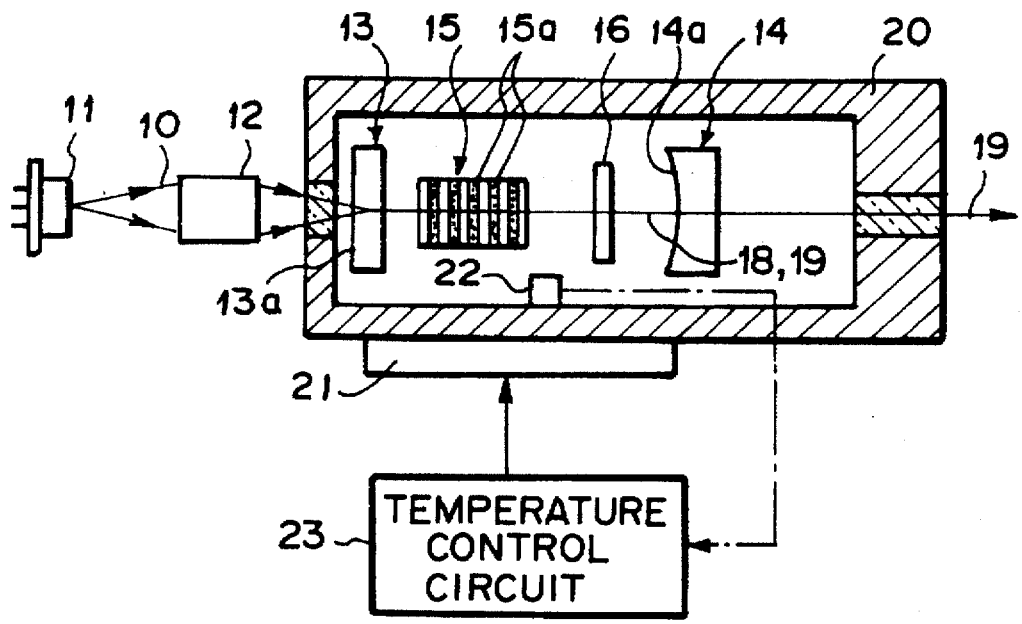
FIG. 1 is a schematic side view showing a wavelength-conversion laser in one embodiment of the present invention.
Figure 2:
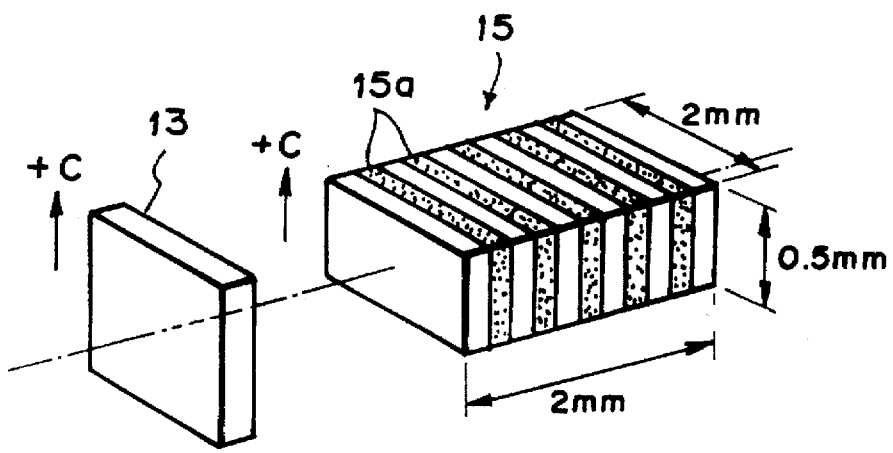
FIG. 2 is a perspective view showing the essential elements of the wavelength-conversion laser shown in FIG. 1.

Referring to the accompanying drawings, a preferred embodiment of the present invention will now be described in detail hereunder. FIG. 1 shows a laser-diode-pumped solid-state laser in one embodiment of the present invention. This laser-diode-pumped solid-state laser is made up of a semiconductor laser 11 for emitting a laser beam as a pump beam; a collimating lens 12 consisting of, for example, a refractive index type lens for collecting the laser beam 10 which is divergent light; a YVO$_4$ crystal (Nd:YVO$_4$ crystal) which is a solid-state laser medium doped with Neodymium (Nd); and a resonator mirror 14 disposed on the front side of the Nd:YVO$_4$ crystal 13 (i.e., on the right side in the drawing).

A MgO:LiNbO$_3$ (LiNbO$_3$ doped with MgO) crystal 15 which is a nonlinear optical crystal possessing periodic domain reversals, and an etalon 16 are interposed between the resonator mirror 14 and the Nd:YVO$_4$ crystal 13.

The previously mentioned elements 13 through 16 are fixedly housed in a housing 20 made of, for example, copper possessing a high thermal conductivity. A Peltier element 21 is provided, as a temperature control element, in an area of the housing 20 close to the solid-state laser resonator (which is made up of the resonator mirror 14 and the Nd:YVO$_4$ crystal 13 as will be described later). A temperature sensor 22 is also housed in the housing 20 for sensing a temperature in the resonator. The actuation of the Peltier element 21 is controlled by a temperature control circuit 23 which receives an output from the temperature sensor 22, whereby the temperature of the inside of the resonator is maintained at a predetermined temperature. The temperature of the semiconductor laser 11 is also maintained at a predetermined temperature by means of temperature control means (not shown).

A semiconductor laser which emanates the laser beam 10 at a wavelength of 808 nm is used as the semiconductor laser 11. The Nd:YVO$_4$ crystal 13 has an Nd concentration of 1 atm. %, and it is arranged in such a way that the c-axis of the crystal 13 is brought into line with the orientation of linear polarization of the laser beam 10. This is attributable to the fact that the absorption factor of the laser beam 10 will become larger compared with the case where the a-axis of the crystal 13 is brought into line with the orientation of the linear polarization of the laser beam 10.

On the other hand, the MgO:LiNbO$_3$ crystal 15 has a MgO concentration of 5 mol. %, and a pitch of the domain reversals 15a extending in a plane including the c-axis of the crystal 15 is set to 6.95 μm. The end faces of the crystal 15 through which light passes measure 2×0.5 mm, and the crystal 15 has a thickness of 2 mm. The MgO:LiNbO$_3$ crystal 15 is disposed in such a way that the Nd:YVO$_3$ crystal 13 is brought in to line with the c-axis.

Neodymium ions in the Nd:YVO$_4$ crystal 13 are excited by the incoming laser beam 10, and a laser beam 18 having a wavelength of 1064 nm is emitted. This laser beam 18 resonates between an end face 13a of the Nd:YVO$_4$ crystal 13 and a mirror surface 14a of the resonator mirror 14. After having been subjected to type-I phase-matching by means of the MgO:LiNbO$_3$ crystal 15, the laser beam 18 is converted to a second harmonic wave 19 having a one-half wavelength, that is, a wavelength of 532 nm.

The rear-side end face 13a of the Nd:YVO$_4$ crystal 13 is covered with a coating which permits appropriate transmission of the laser beam 10 but appropriately reflects the laser beam 18 and the second harmonic wave 19. On the other hand, the mirror surface 14a of the resonant mirror 14 is covered with a coating which appropriately reflects the laser beam 18 but permits a part of the second harmonic wave 19 to pass through. The etalon 16 is made of, for example, a quartz plate, and both ends thereof are covered with a coating that becomes partially reflective with respect to light at a wavelength of 1064 nm but unreflective with respect to light at wavelength of 532 nm.

In this embodiment, the laser beam 18 is put into a single longitudinal mode by virtue of the effect of the etalon 16. This, in turn, results in the second harmonic wave 19 being put rendered into a single longitudinal mode. Thereafter, a part of the second harmonic wave 19 is emitted from the resonator mirror 14. The MgO:LiNbO$_3$ crystal 15 and the Nd:YVO$_4$ crystal 13 are arranged in such a way that both crystals are brought into line with the c-axis, and hence π polarization oscillation occurs by virtue of the anisotropy of the Nd:YVO$_4$ crystal 13 (a difference in gain between π polarization and σ polarization). This intrinsic polarization mode remains unchanged even if the temperature of the resonator changes, and therefore π polarization oscillation is maintained constantly. For this reason, the laser beam is also maintained in a single longitudinal mode.

As previously mentioned, in a conventional wavelength-conversion laser which uses the Nd:YVO$_4$ crystal as a solid-state laser medium and has an etalon disposed in a resonator together with a KTP crystal, if the temperature of the resonator changes by 0.5° C., oscillation in a multiple longitudinal mode will occur, or mode hopping will occur. In contradistinction to this, in the case of the above mentioned embodiment, it becomes possible to stably maintain oscillation in a single longitudinal mode even if the temperature of the resonator changes by about 2° C. In this way, as a result of the extension of the range of temperatures where oscillation in a single longitudinal mode can be maintained, age-based stability of the wavelength-conversion laser is remarkably improved compared with a conventional wavelength-conversion laser. More over, it becomes possible to realize oscillation in a single longitudinal mode over 1000 hours.

The nonlinear optical crystal that effects type-I phase-matching is not limited to the previously mentioned MgO:LiNbO$_3$ crystal 15 possessing periodic domain reversals. Other MgO:LiNbO$_3$ crystals without the periodic domain reversals, and other crystals such as LiTaO$_3$, KNbO$_3$, β-BBO, LBO, Ba$_2$NaNb$_5$O$_{15}$ are also usable.

When crystals possessing periodic domain reversals are used as the nonlinear optical crystal that effects type-I phase-matching, a LiNbO$_3$ crystal, a LiTaO$_3$ crystal, or a KTP crystal, each possessing periodic domain reversals, other than the above mentioned MgO:LiNbO$_3$ crystal is also usable. In addition to the crystals set forth above, nonlinear optical crystal possessing periodic modulation of a refractive index is also usable.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A wavelength-conversion laser including a YVO$_4$ crystal doped with Neodymium (Nd) which is pumped by light, a nonlinear optical crystal disposed in a resonator for converting the wavelength of a solid-state laser beam emitted from the YVO$_4$ crystal, and an etalon disposed in the resonator for changing the mode of oscillation of the solid-state laser beam to a single longitudinal mode, the wavelength-conversion laser comprising:

a crystal for realizing type-I phase matching being employed as the nonlinear optical crystal.

2. The wavelength-conversion laser as defined in claim 1, wherein the nonlinear optical crystal has periodic domain reversals.

3. The wavelength-conversion laser as defined in claim 2, wherein the nonlinear optical crystal possessing the periodic domain reversals is a MgO:LiNbO$_3$ crystal.

4. The wavelength-conversion laser as defined in claim 1, wherein the YVO$_4$ and nonlinear crystals each have a c-axis, and said YVO$_4$ and nonlinear crystals are arranged with respect to each other so that their c-axes are in alignment.

5. The wavelength-conversion laser as defined in claim 1, wherein the YVO$_4$ crystal has a c-axis which is in alignment with an orientation of linear polarization of the pumping light.

6. The wavelength-conversion laser as defined in claim 1, wherein a surface of the Nd:YVO$_4$ crystal is covered with a coating which is highly reflective with respect to said laser beam emitted from the Nd:YVO$_4$ crystal.

7. The wavelength-conversion laser as defined in claim 1, further comprising a resonator mirror, a mirror surface of said resonator mirror is covered with a coating which is highly reflective with respect to the laser beam emitted from the Nd:YVO$_4$ crystal and which is lowly reflective with respect to a laser beam whose wavelength has been converted by the nonlinear optical crystal.

8. The wavelength-conversion laser as defined in claim 1, wherein said etalon is disposed between said nonlinear optical crystal and a resonant mirror.

9. A wavelength-conversion laser comprising a YVO$_4$ crystal doped with Neodymium (Nd) which is pumped by light, a nonlinear optical crystal disposed in a resonator for converting the wavelength of a solid-state laser beam emitted from the YVO$_4$ crystal, and an etalon disposed in the resonator for changing the mode of oscillation of the solid-state laser beam to a single longitudinal mode;

wherein a crystal for realizing Type-I phase matching is employed as the nonlinear optical crystal; and wherein the YVO$_4$ crystal has an Nd concentration of 1 atm. %.

10. A wavelength-conversion laser comprising a YVO$_4$ crystal doped with Neodymium (Nd) which is pumped by light, a nonlinear optical crystal disposed in a resonator for converting the wavelength of a solid-state laser beam emitted from the YVO$_4$ crystal, and an etalon disposed in the resonator for changing the mode of oscillation of the solid-state laser beam to a single longitudinal mode;

wherein a crystal for realizing Type-I phase matching is employed as the nonlinear optical crystal, the nonlinear optical crystal comprising an MgO:LiNbO$_3$ crystal having periodic domain reversals; and wherein the nonlinear crystal has an MgO concentration of 5 mol. %.

\* \* \* \* \*